United States Patent

[11] 3,629,793

[72] Inventors Helmut Ettischer
Ruit, Kreis, Eblingen;
Dietmar Blattner, Schwaikheim, both of Germany
[21] Appl. No. 855,662
[22] Filed Sept. 5, 1969
[45] Patented Dec. 21, 1971
[73] Assignee Eastman Kodak Company
Rochester, N.Y.
[32] Priority Sept. 25, 1968
[33] Germany
[31] K 62 459/57A

[54] BATTERY COMPARTMENT
4 Claims, 2 Drawing Figs.
[52] U.S. Cl. .................................................. 339/91 R,
95/11 R, 136/166, 240/10.6
[51] Int. Cl. .................................................. H01r 13/54
[50] Field of Search .......................................... 339/45, 91;
95/11; 240/6.4, 10.6, 10.65; 136/166, 173;
179/107

[56] References Cited
UNITED STATES PATENTS
1,497,786   6/1924   Hoge ............................ 136/173
2,439,408   4/1948   Mitchell ...................... 250/13
FOREIGN PATENTS
597,663   11/1925   France ......................... 136/173

Primary Examiner—Joseph H. McGlynn
Attorneys—Robert W. Hampton and Milton S. Sales ABSTRACT: A battery compartment includes a body portion forming a battery receiving cavity and a cover hingably mounted on the body portion to close the cavity. An electrical lead is positioned adjacent the outside of the body portion and forms a pair of bearing surfaces and a resilient finger, the latter of which cooperates with a projection on the cover to latch the cover closed. A current conductor is carried on the inner surface of the cover and includes a first resilient finger which extends into the cavity to contact a pole of a received battery and a pair of resilient fingers electrically connected to the first resilient finger and positioned to contact the bearing surfaces of the lead when the cover is closed to complete the circuit and to provide an opening force to the cover.

PATENTED DEC 21 1971  3,629,793

HELMUT ETTISCHER
DIETMAR BLÄTTNER
INVENTORS

BY Milton S. Sales
Robert W Hampton
ATTORNEYS

BATTERY COMPARTMENT

BACKGROUND OF THE INVENTION

1. Field of the Invention

The present invention relates to battery compartments such as those used in cameras or flash units, and more particularly to such battery compartments having a closable cover provided with current conductors thereon which, upon closing the cover, immediately and automatically contact a battery pole.

2. Description of the Prior Art

Various designs of battery compartments are known in the art. In cameras and flash units, the battery compartments may be provided with covers which take the form of insertable lids, slides or hinged covers carrying conductors for contacting a battery pole. It is also known to secure the covers in their closed positions by locks or resilient latching devices. One such design is shown in German Pat. No. 1,086,994 wherein a pair of batteries may be inserted into a compartment having a first electrical conductor at the bottom and wherein a screw-in cap forms a second conductor contacting the opposite poles of the batteries. While such designs are satisfactory, the apparatus is expensive to manufacture and somewhat awkward to use.

SUMMARY OF THE INVENTION

It is an object of the present invention to provide a battery compartment having an improved latching mechanism for the cover so that the cover can be opened by simply releasing the latch regardless of whether batteries are received in the compartment.

It is another object of the present invention to provide a battery compartment in which the electrical lead running from the battery compartment forms a portion of the cover latch mechanism.

It is yet another object of the present invention to provide a battery compartment having a closable cover, the cover carrying an electric current conductor positioned to contact an electric lead adjacent the body portion of the compartment, the contact between the conductor and the lead being under spring pressure which applies an opening force to the cover whereby the cover will be opened by the spring pressure between the lead and the conductor.

In a preferred embodiment of the present invention, the cover carries a resilient conductor which is positioned to contact a bearing surface on an electrical lead adjacent the body portion of the compartment when the cover is closed, the contact between the bearing surface and the conductor deforming the conductor to produce an opening force imposed upon the closed cover. The cover is latched closed by a projection on the cover which cooperates with a deformable, resilient finger integrally formed with the lead and having means for receiving the projection on the cover. The conductor on the cover includes a resilient finger which extends into the body portion to contact a battery received therein.

The invention and its objects and advantages will become more apparent in the detailed description of the preferred embodiment presented below.

BRIEF DESCRIPTION OF THE DRAWING

In the detailed description of the preferred embodiment of the invention presented below, reference is made to the accompanying drawing, in which.

DESCRIPTION OF THE PREFERRED EMBODIMENT

Because cameras are well known, the present description will be directed in particular to elements forming part of, or cooperating more directly with, apparatus in accordance with the present invention. It is to be understood that camera elements, not specifically shown or described may take various forms well known to those skilled in the art.

Figure 2:
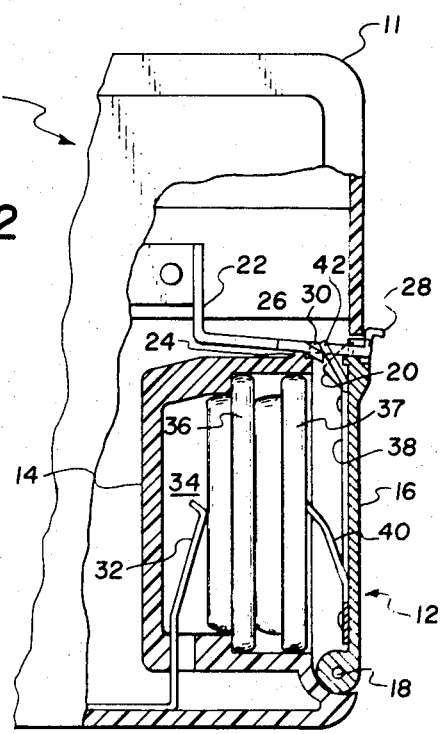
FIG. 2 is a front, sectional view of the battery compartment shown in FIG. 1.
Figure 1:
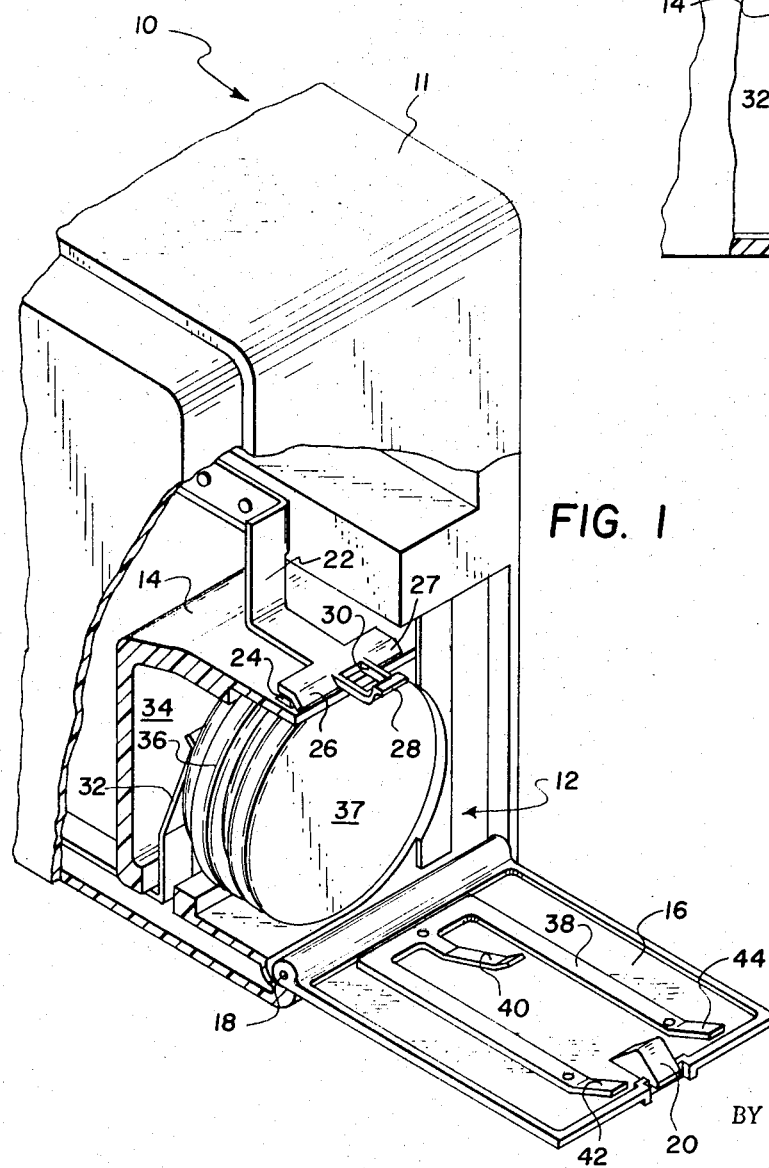
FIG. 1 is a perspective view, partially broken away, of the battery compartment of the present invention.

The camera 10 shown in FIGS. 1 and 2 is of generally conventional design, comprising a boxlike housing 11 which contains an electrically operated device, not shown, such as an automatic exposure control system or a flash unit. While the invention has been shown in the environment of a camera, it is readily apparent that it will also be of utility in different applications such as in a flash unit per se. Housing 10 contains a battery compartment 12 formed of a body portion 14 and a cover 16 hingeably mounted at 18 to body portion 14. Cover 16 has an integrally formed projection 20 which forms part of a latch mechanism to be fully described hereinafter.

Camera housing 11 carries a first electrical lead 22 for transmitting current from the battery compartment. Lead 22 is formed of resilient material and resiliently presses against a protrusion 24 on body portion 14. Lead 22 has a pair of bearing surfaces 26 and 27 adjacent the position of cover 16 when closed. A finger 28 extends from lead 22 and has a hole 30 therein for receiving projection 20 of cover 16 when the cover is closed. It can be seen that cover 16 can be opened by manually raising finger 28 against the spring force of lead 22.

A conductor 32 extends into a cavity 34 of body portion 14. Cavity 34 is shaped to receive a pair of electrical batteries 36 and 37 of which one pole contacts conductor 32.

Cover 16 carries a second conductor 38 which has a resilient finger 40 extending into cavity 34 to contact a pole of battery 37 when cover 16 is closed. Conductor 38 also has a pair of resilient fingers 42 and 44 which are aligned with bearing surfaces 26 and 27 respectively. When cover 16 is closed, fingers 42 and 44 are resiliently deformed against bearing surfaces 26 and 27. When finger 28 is raised to unlatch the cover, the spring force stored in fingers 42 and 44 acts to open the cover. This force is present even though the battery compartment does not contain batteries. Once the cover is opened, the spring force stored in conductor 32 serves to at least partially eject batteries 36 and 37 from compartment 12.

As can be seen from the foregoing description, in the illustrated embodiment of the present invention there is provided a simple, compact and inexpensive device for receiving electrical batteries in which the electrical conductors which serve to transmit current from the batteries also serve to provide an opening force for the cover wherein the cover can be easily opened even though no batteries are contained in the compartment.

The invention has been described in detail with particular reference to a preferred embodiment thereof, but it will be understood that variations and modifications can be effected within the spirit and scope of the invention.

We claim:

1. A battery compartment for receiving at least one electrical battery, said compartment comprising:
    a. a body portion having a cavity for receiving the battery;
    b. a closable cover for said body portion said cover having a projection thereon;
    c. an electrical lead adjacent said body portion;
    d. means for latching said cover closed and including a deformable, resilient finger integrally formed with said lead and having means for receiving said projection on said cover; and
    e. means for electrically connecting one pole of a received battery to said lead when said cover is closed.

2. A battery compartment as defined in claim 1 wherein:
    a. said lead has a bearing surface thereon; and
    b. said connecting means includes an electrical conductor on said cover, said conductor being positioned to contact said bearing surface when said cover is closed, the contact between said bearing surface and said conductor being under compression spring pressure applying opening force to said cover, whereby said cover is opened by said spring pressure when said latching means is released.

3. A battery compartment as defined in claim 2 wherein said conductor includes an electrically conductive, resilient finger positioned to contact said bearing surface when said cover is closed, the contact between said finger and said electrical lead deforming said finger to provide said spring pressure.

4. A battery compartment as defined in claim 2 wherein said connecting means includes a resilient finger on said cover extending into said cavity when said cover is closed to contact a pole of a received battery, said finger being electrically connected to said conductor.

* * * * *